United States Patent [19]

Ouimet et al.

[11] 4,140,884
[45] Feb. 20, 1979

[54] ELECTRONIC TONE RINGER

[75] Inventors: Donald J. Ouimet, Vernon Hills; Richard D. Gilreath, Roundlake Beach, both of Ill.

[73] Assignee: Telephone and Data Products, Madison, Wis.

[21] Appl. No.: 833,054

[22] Filed: Sep. 14, 1977

[51] Int. Cl.² .............................................. H04M 1/00
[52] U.S. Cl. .................................................... 179/84 T
[58] Field of Search ................ 179/84 R, 84 L, 84 T, 179/17 E, 81 R, 17 A, 2 A; 340/384 E

[56] References Cited

U.S. PATENT DOCUMENTS

| 3,278,687 | 10/1966 | Everett | 179/17 A |
|---|---|---|---|
| 3,466,403 | 9/1969 | Combridge | 179/84 T |

FOREIGN PATENT DOCUMENTS

| 1462308 | 3/1969 | Fed. Rep. of Germany | 179/84 T |
|---|---|---|---|
| 2142858 | 8/1971 | Fed. Rep. of Germany | 178/84 T |
| 1318870 | 5/1973 | United Kingdom | 179/84 T |

*Primary Examiner*—Kathleen H. Claffy
*Assistant Examiner*—Joseph A. Popek
*Attorney, Agent, or Firm*—Leydig, Voit, Osann, Mayer & Holt, Ltd.

[57] ABSTRACT

An electronic tone ringer for a telephone set produces a tone in response to the presence of a conventional a.c. ring signal between the tip and ring leads of the telephone set. The electronic tone ringer rectifies the ring signal to produce a d.c. voltage. The resulting d.c. voltage is connected to a sounding device through a timing circuit which filters out short duration line transients.

1 Claim, 2 Drawing Figures

ELECTRONIC TONE RINGER

BACKGROUND OF THE INVENTION

This invention relates to telephony and more particularly to an electronic tone ringer for a telephone set.

In a conventional telephone ringing system, an a.c. ring signal, typically 20 hz., produced by a ring generator at a central location from the telephone set, is connected to the tip and ring leads of the subscriber's telephone set. In such a system, the 20 hz. ring signal is used to energize an electromagnetic coil in the telephone set which in turn activates a mechanical clapper for a bell to create the ringing sound of the conventional telephone set.

Such a telephone ringing system with an electromechanical bell ringer suffers several disadvantages. In the first place, driving the electromagnetic coil requires a substantial amount of power thereby limiting the number of telephones that can be driven by a single telephone ring generator. In the case of private exchanges where numerous telephones are connected to a single central switching system additional ring generators may be required, especially in subscriber carrier systems.

Second, the conventional electromechanical bell ringer is heavy in weight because an iron core is required in order for the electromagnetic coil to generate sufficient magnetic flux to drive the bell's clapper.

Third, the electromechanical bell ringer is prone to failures resulting from mechanical wear.

Electronic tone ringers have been proposed in the past, but in most cases these electronic tone ringers utilized a speaker having a paper cone which was fragile and subject to deterioration and damage. Furthermore, such electronic ringers having a speaker often required a transformer to drive the speaker and a heavy magnet as part of the speaker. The use of a transformer with its iron core and magnetic speaker provided very little advantage over the conventional electromechanical bell ringer.

Also because the electronic circuitry could respond instantaneously to a.c. signals on the telephone leads, the electronic ringers also had the annoying tendency to sound in response to transients in the telephone leads caused by dialing pulses or the line being seized prior to ringing. The conventional electromechanical bell ringers were not prone to respond to such line transients because of the magnetic and mechanical time delays inherent in the electromechanical ringer with its magnetic coil and mechanical clapper.

It is, therefore, an object of the present invention to provide an electronic tone ringer which is light in weight, rugged in construction, and economical to build.

Furthermore, it is an object of the present invention to provide an electronic tone ringer requiring low power which can operate directly from the ring signal and which requires no other source of electromotive power.

It is also an object of the present invention to provide an electronic tone ringer which is immune to line transients.

It is a further object of the present invention to provide an electronic tone ringer which is adaptable for use in a two-party telephone system.

Other objects and advantages of the invention will become apparent upon reading the following detailed description and upon reference to the drawings, in which:

FIG. 1 is a electrical schematic of the electronic tone ringer of the present invention; and FIG. 2 is an electrical schematic diagram of the electronic tone ringer which is adapted for use in a two-party telephone system.

DETAILED DESCRIPTION OF THE INVENTION

While the present invention will be described in connection with a preferred embodiment, it will be understood that I do not intend to limit the invention to that embodiment. On the contrary, I intend to cover all alternatives, modifications and equivalents as may be included within the spirit and scope of the invention as defined by the appended claims.

Figure 1:
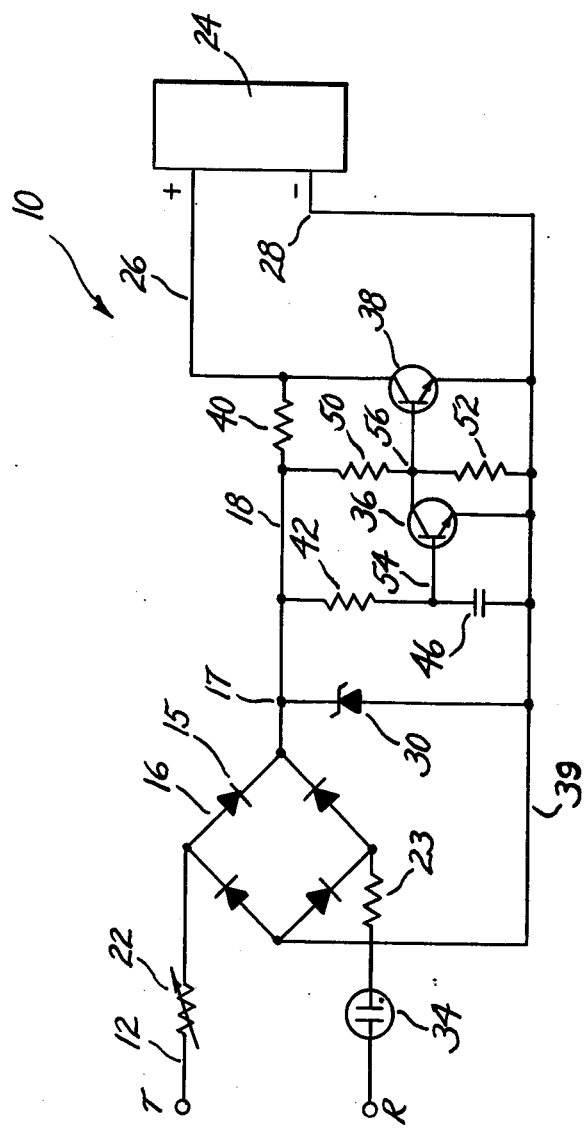

Turning to FIG. 1, an electronic tone ringer 10 embodying the present invention is connected to the tip lead 12 and the ring lead 14 of a telephone loop. A ring generator (not shown) is connected across the tip and ring leads and provides an alternating current, 20 hz. ring voltage. The ring voltage is the only source of electromotive power required for the electronic tone ringer 10.

The electronic tone ringer 10 has a rectifier circuit 16 which converts the a.c. ring voltage to a d.c. voltage. The d.c. voltage appears between node 17 and return 39 and is connected via timing circuit 18 to inputs 26 and 28 of sounding device 24. The timing circuit 18 determines whether or not the d.c. voltage at node 17 was produced in response to a legitimate ringing signal or was merely the result of a line transient.

The sounding device 24 is an integral ceramic crystal oscillator with a thin metal sounding diaphragm which produces an electronic tone in response to and in proportion to a d.c. voltage at its inputs 26 and 28. The sounding device 24 is rugged, light in weight and inexpensive and is readily available in the computer art from various electronic manufactures. For example, Floyd Bell Associates, Inc., Columbus, Ohio, offers such a device as its model 2322-2-2 which has the following specifications:

Model 2322-2-2

Electrical Specifications:

Operating voltage = 5–16 VDC.
Operating current = 2–15 mA (voltage dependent).
Operating frequency -3100 Hz (±500 Hz).
Operating mode: Apply power/on; Remove power/off.
Typical values: $I$ — 12 mA 16 VDC, output 85 db.

General Specifications:

Sound output - Continuous tone to 85 db (voltage dependent).
Operating temperature — 20° C. to 65° C.
Storage temperature — 40° C. to 85° C.
Terminals — 20 ga. (0.032 dia). P.C. pins.
Case material — ABS or KJB (flame retardant) thermoplastic, black.
Finish — As moulded In operation the electronic tone ringer is activated when an a.c. ring voltage of 20 hz. is connected between the tip and ring lead. The a.c. ring voltage is connected to rectifier circuit 16 which produces a d.c. voltage between node 17 and return 39. The rectifier circuit consists of variable resistor 22, neon bulb 34, diode bridge 15 and zener diode 30. Fixed resistor 23 in the ring lead limits the a.c. current fed to the diode bridge 15. Variable resistor 22 in the tip lead variably controls the a.c. current fed to the diode bridge 15 and thereby controls the amplitude of the d.c. voltage at the output of the bridge. The neon bulb 34 blocks the d.c. current in the telephone loop in the absence of a.c. current. The zener diode 30 is connected between node 17 and return 39 to protect the sounding device 24 from any overvoltage that might develop due to transients in the tip or ring lead.

In accordance with the present invention, I have discovered that the sounding device 24 can be most advantageously used by incorporating timing circuit 18 which provides a delay of approximately 8 milliseconds before the d.c. voltage between node 17 and return 39 is available at inputs 26 and 28 of the sounding device 24. The 8 millisecond delay keeps the sounding device from giving short bursts of sound during dialing transients or when the loop is opened after use.

The timing circuit 18 consist of transistors 36 and 38. Transistor 36 in conjunction with an RC timing network consisting of resistor 42 and capacitor 46 provides the 8 millisecond timing delay, and transistor 38 provides switching for controlling the sounding device 24. When a d.c. voltage first appears between node 17 and return 39 in response to an a.c. voltage on the line, transistor 38 of timing circuit 18 in initially biased "on" by resistors 50 and 52 and provides an essentially short circuit across the inputs of the sounding device so that no voltage is initially applied through resistor 40 to the sounding device.

Also, the capacitor 46 is initially uncharged and provides a low inpedance path short to the return 38 so that transistor 36 remains "off".

After the d.c. voltage is applied to the timing circuit at node 17, the capacitor 46 begins charging through resistor 42. If the d.c. voltage lasts longer than 8 milliseconds, capacitor 46 is sufficiently charged so that the base 54 of transistor 36 is positive thereby turning on transistor 36. When transistor 36 is turned on, its collector 56 becomes potentially low (with respect to node 17) which in turn causes the base of transistor 38 to become low and turns transistor 38 "off". With transistor 38 turned off the short circuit is no longer present across the inputs to the sounding device and the d.c. voltage at node 17 is connected through resistor 40 to the sounding device.

If the d.c. voltage lasts for less than 8 milliseconds (indicating a dialing pulse or other line transient) capacitor 46 does not charge sufficiently to cause the timing circuit 18 to change states and connect the d.c. voltage to the sounding device.

The variable resistor 22 in the tip lead provides a means of adjusting the volume of the sounding device.

Figure 2:
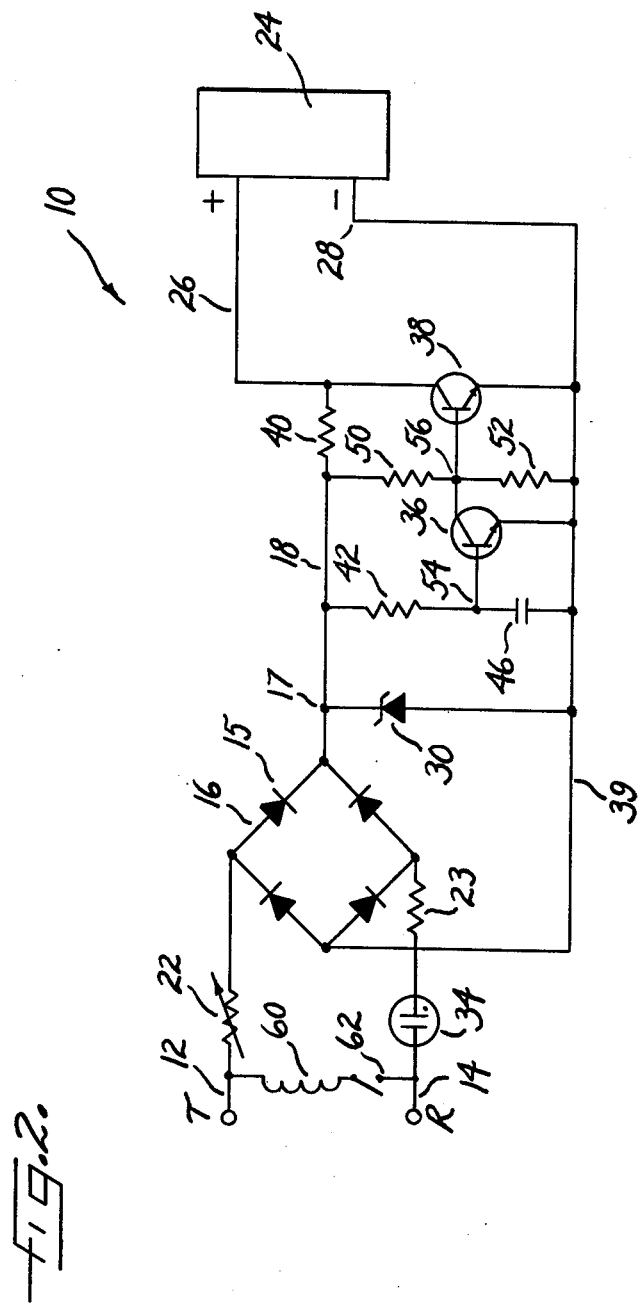

Turning to FIG. 2, it can be seen that FIG. 2 is the same as FIG. 1 except that inductor 60 having a known d.c. resistance ahs been attached between the tip lead and ring lead through hook switch 62. The inductor 60 is used to provide for two-party service. The "tip" party's ringer has the inductor connected as shown in FIG. 2 while the "ring" party's ringer does not include the inductor.

During the outgoing toll calls, the tip side of the two-party line is sampled for a resistive ground. If a resistive ground through inductor 60 is detected the "tip" party is determined to be the user. If no ground is detected, the "ring" party is determined to be the user. In that way, the central billing system can determine which party is using the service and provide the proper billing for the services being used.

I claim:

1. In a telephone system having a telephone loop with a tip and a ring lead and a source of a.c. ring voltage connected across the tip and ring leads, an electronic tone ringer comprising a rectifier circuit connected across the tip and ring leads to provide a d.c. voltage, a sounding device having inputs connected to the rectifier circuit and responsive to the d.c. voltage to produce a tone, and a timing circuit interconnected between the rectifier circuit and the sounding device which timing circuit includes a timing network connected across the d.c. voltage for establishing a predetermined time delay, a first transistor connected to the timing network and activated by the timing network at the end of the predetermined time delay and a second transistor connected to and controlled by the first transistor, the second transistor further being connected across the inputs of the sounding device so that prior to the expiration of the predetermined time delay the second transistor shunts the inputs of the sounding device to assure that the sounding device is not erroneously activated by a short duration transient voltage across the tip and ring leads.

* * * * *